United States Patent
Shao (10) Patent No.: US 7,929,632 B2
(45) Date of Patent: Apr. 19, 2011

(54) APPARATUS AND ASSOCIATED METHODS TO IMPLEMENT A HIGH THROUGHPUT WIRELESS COMMUNICATION SYSTEM

(75) Inventor: Lei Shao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1961 days.

(21) Appl. No.: 10/942,247

(22) Filed: Sep. 15, 2004

(65) Prior Publication Data

US 2005/0128936 A1 Jun. 16, 2005

Related U.S. Application Data

(60) Provisional application No. 60/503,092, filed on Sep. 15, 2003.

(51) Int. Cl.
*H04L 1/02* (2006.01)
(52) U.S. Cl. ........ 375/267; 375/260; 375/299; 375/340; 370/330; 370/436; 370/437; 370/478; 455/112
(58) Field of Classification Search .......... 375/140, 375/141, 146, 267, 295, 299, 260; 370/203, 370/208, 211, 319, 330, 436, 437, 464, 465, 370/478; 455/101, 112, 59
See application file for complete search history.

(56) References Cited

U.S. PATENT DOCUMENTS

| | | | |
|---|---|---|---|
| 5,933,423 A * | 8/1999 | Laakso et al. | 370/335 |
| 6,097,771 A | 8/2000 | Foschini | |
| 7,002,900 B2 * | 2/2006 | Walton et al. | 370/208 |
| 7,315,577 B2 * | 1/2008 | Shao | 375/260 |
| 2003/0144033 A1 * | 7/2003 | Sumasu et al. | |
| 2004/0192218 A1 * | 9/2004 | Oprea | |
| 2005/0002325 A1 * | 1/2005 | Giannakis et al. | |
| 2005/0157810 A1 * | 7/2005 | Raleigh et al. | |

FOREIGN PATENT DOCUMENTS

| JP | 10-84324 | 3/1998 |
|---|---|---|
| WO | WO 03/056742 | 7/2003 |

OTHER PUBLICATIONS

Walton et al. (US 2003/0112880); Jun. 19, 2003; Method and Apparatus for Processing Data for Transmssion In A Multi-Channel Communication System Using Selective Channel Inversion.*
Petre et al. (US 2004/0120274); Jun. 24, 2004; CDMA Transceiver Techniques For Wireless Communications.*
Giannakis et al. (US 2007/0253496); Nov. 1, 2007; Wireless Communication System Having Linear Encoder.*
Rajkotia et al. (US 2004/0121774); Jun. 24, 2004; Apparatus And Method For Performing An Interfrequency Handoff In A Wireless Network.*
International application No. PCT/US2004/030380 Int'l Prelim Report on Patentability Chapter 1, dated Mar. 23, 2006.
Thomas Ta et al—A Method for Improving the Performance of Successive Cancellation in Mobile Spread Mimo OFDM—VTC 2002-Fall—2002 IEEE 56th Vehicular Technology Conference Proceedings vol. 1, Sep. 24, 2002-Aug. 28, 2002 pp. 18-22—XP002324418.

(Continued)

*Primary Examiner* — Dac V Ha
(74) *Attorney, Agent, or Firm* — Trop, Pruner & Hu, P.C.

(57) ABSTRACT

An apparatus and associated methods to implement a high throughput wireless communication system are generally presented.

36 Claims, 4 Drawing Sheets

OTHER PUBLICATIONS

Wang et al—Complex-Field Coding for OFDM Over Fading Wireless Channels—IEEE Transactions on the information theory—IEEE Inc.—vol. 49, No. 3 Mar. 2003 pp. 707-720—XP002318956.
Jianxuan et al—Channel Estimation for D-Blast OFDM Systems—Globecom'02 2002—IEEE Global Telecommunications conference—Conference proceedings Taipei, Taiwan, Nov. 17-21, 2002 vol. 1 or 3 pp. 335-339—XP010635968.
Foschini—Layered Space-Time Architecture for Wireless Communication in a Fading Environment When Using Multi-Element Antennas—Bell Labs Technical Journal, Wiley, CA—vol. 1, No. 2—Sep. 21, 1996 pp. 41-59, XP000656005.
Lei et al—High Rate Space Frequency Block Codes for Next Generation 802.11 WLANS—Communications, 2004 IEEE International Conference on Paris France Jun. 20-24, 2004, Piscataway, NJ—vol. 5, Jun. 20, 2004 pp. 2995-2999, XP010712308.
PCT/US2004/030380—International Search Report and Written Opinion Mailed Apr. 27, 2005.
Thomas, T.A. and Vook, F.W., A Method for Improving the Performance of Successive Cancellation in Mobile Spread MIMO OFDM, Vehicular Technology Conference, 2002, Proceedings, VTC 2002-Fall, 2002 IEEE 56th, USA, Sep. 28, 2002. pp. 18-22, vol. 1.
Japanese Patent Office, Japanese Office Action issued in corresponding Japanese Application No. P2006-526433, 7 pgs., Apr. 6, 2009.
Japanese Patent Office, Office Action with English translation issued in corresponding Japanese Application No. P2006-526433, 6 pages, Mar. 4, 2010.
N. Khaled et al., A New Joint Transmit and Receive Optimization Scheme for OFDM-Based MIMO Systems, Vehicular Technology Conference 2003. VTC 2003-Spring., The 57th IEEE Semiannual, USA, Apr. 25, 2003, vol. 2, pp. 998-1002.
T.A. Thomas, et al., A method for Improving the Performance of Successive Cancellation in Mobile Spread MIMO OFDM, Vehicular Technology Conference, 2002 Proceedings, VTC 2002-Fall, 2002 IEEE 56th, USA, Sep. 28, 2002, vol. 1, pp. 18-22.

* cited by examiner

FIG. 7

APPARATUS AND ASSOCIATED METHODS TO IMPLEMENT A HIGH THROUGHPUT WIRELESS COMMUNICATION SYSTEM

PRIORITY APPLICATIONS

This application claims priority to provisional application No. 60/503,092 entitled An Apparatus and Associated Methods to Implement a High Throughput Wireless Communication System filed by Shao, et al. on Sep. 15, 2003; and patent application Ser. No. 10/789,387 entitled An Apparatus and Associated Methods to Introduce Diversity in a Multicarrier Channel filed on Feb. 26, 2004 by Sumit Roy, Sumeet Sandhu and Lei Shao, the disclosure of which are expressly incorporated herein by reference for all purposes.

TECHNICAL FIELD

Embodiments of the present invention are generally directed to wireless communication systems and, more particularly, to an apparatus and associated methods to implement space-frequency coding within a wireless communication system.

BACKGROUND

A multicarrier communication system such as, e.g., Orthogonal Frequency Division Multiplexing (OFDM), Discrete Multi-tone (DMT) and the like, is typically characterized by a frequency band associated with a communication channel being divided into a number of smaller sub-bands (subcarriers herein). Communication of information (e.g., data, audio, video, etc.) between devices in a multicarrier communication system is performed by dividing the informational content into multiple pieces (e.g., bits, bytes, symbols, etc.), and then transmitting the pieces, perhaps in parallel, using a number of the separate subcarriers. When the symbol period transmitted through a subcarrier is longer than a maximum multipath delay in the channel, the effect of intersymbol interference (ISI) between the subcarriers may be significantly reduced.

To increase the data rate and/or throughput of wireless communications, wireless signals may be transmitted and/or received using more than one antenna over more than one spatial channel utilizing the same frequency subcarriers. These systems are sometimes referred to as multiple input/multiple output (MIMO) systems and may exploit the multipath diversity between the antennas. Conventional MIMO systems may encode the signals for transmission using convolutional coding and/or Viterbi decoding techniques, however such techniques are sensitive to antenna separation and antenna fading correlation.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Embodiments of an apparatus and associated methods to implement a full-rate, space frequency block coding architecture to improve one or more channel characteristics in a wireless communication system using multiple tones in combination with multiple input and/or multiple output antennae (MIMO, SIMO, MISO, etc.). According to one aspect of the invention, the full-rate, space frequency block code achieves substantially full rate (M uncoded symbols per subcarrier) with high diversity and coding gain for frequency selective fading channels.

To improve receive performance with a lower complexity receiver architecture, different layers of the block code architecture may receive different power allocation to promote orderly detection at the receiver. It will be appreciated, based on the following that the transmitting device need not have any prior understanding of the channel conditions when using the block code architecture disclosed herein, i.e., it supports an open-loop encoding paradigm.

According to one embodiment, the transmitting device may employ pre-coders to generate linear complex field (LCF) precoded symbols, which are mapped to uncorrelated tones and antennas to increase the effective diversity gain. The introduction of the full-rate space frequency block code architecture may alleviate the need for bandwidth consuming forward error control (FEC) codes). It will be appreciated that one or more aspects of the present invention may well be used within a range of electronic devices to support wireless communication in accordance with any of a number of wireless communication platforms such as, e.g., wireless local area network (WLAN), wireless personal area network (WPAN), wireless metro-area networks (WMAN), cellular telephony networks, WiMAX networks and the like.

Reference throughout this specification to "one embodiment" or "an embodiment" means that a particular feature, structure or characteristic described in connection with the embodiment is included in at least one embodiment of the present invention. In this regard, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Other embodiments may incorporate structural, logical, electrical, process and other changes. Examples merely typify possible variations. Individual components and functions are optional unless explicitly required, and the sequence of various disclosed operations may vary without departing from the spirit and scope of the claimed invention.

Example Architecture(s)

Figure 1:
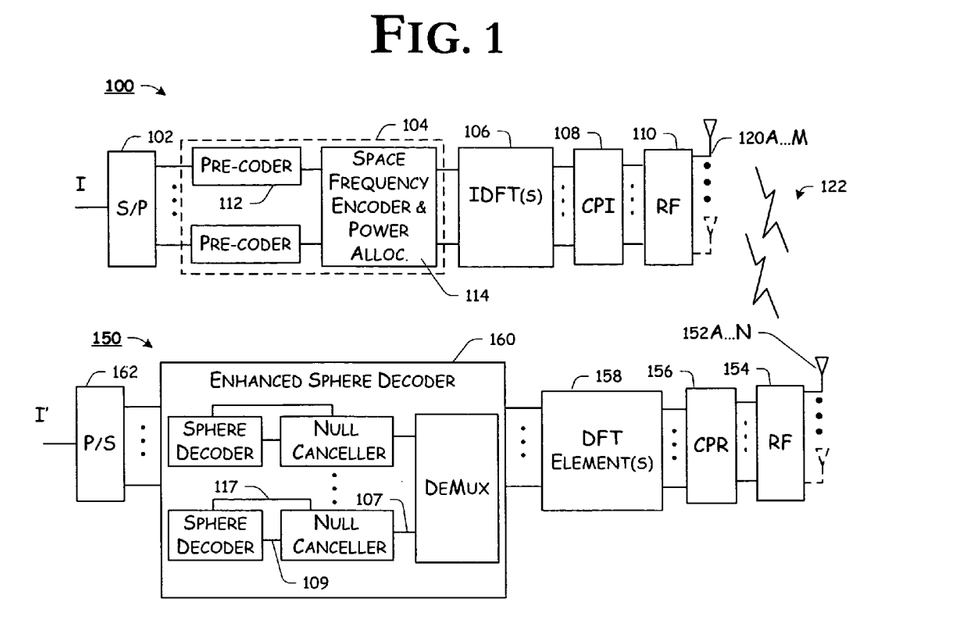
FIG. 1 is a block diagram of an example transceiver architecture incorporating the teachings of the present invention, according to one example implementation.

Turning to FIG. 1, a block diagram of an example transmitter architecture and an example receiver architecture are presented according to embodiments of the invention. To illustrate these architectures within the context of a communication channel between two electronic devices, a transmitter 100 from one device and a receiver 150 from another device associated with a communication channel 122 are depicted. Those skilled in the art will appreciate that a transceiver in either device may well comprise one or more of the transmitter architecture 100 and/or the receiver 150 architecture as detailed in FIG. 1, although the scope of the invention is not limited in this regard. It should be appreciated that transmitter and/ receiver architectures of greater or lesser complexity that nonetheless implement the innovative full-rate, space frequency block coding architecture described herein are anticipated by the scope and spirit of the claimed invention.

According to the example embodiment of FIG. 1, transmitter 100 is depicted comprising one or more serial-to-parallel converter(s) 102, a coding agent 104 incorporating elements of an embodiment of the invention, inverse discrete Fourier transform element(s) 106, cyclical prefix (or, guard interval) insertion element(s) 108, radio frequency (RF) processing element(s) 110 and two or more antenna(e) 120A ... M, each coupled as depicted. According to one embodiment, transmitter architecture 100 may be implemented within a transceiver of a host electronic device. Although depicted as a number of separate functional elements, those skilled in the art will appreciate that one or more elements of transmitter architecture 100 may well be combined into a multi-functional element, and conversely functional elements may be split into multiple functional elements without deviating from the invention.

As used herein, serial-to-parallel (S/P) transform 102 may receive information (e.g., bits, bytes, frames, symbols, etc.) from a host electronic device (or, an application executing thereon, e.g., email, audio, video, data processing, etc.) for communications processing and subsequent transmission via the communication channel 122. According to one embodiment, the information received from the host device/application may be in the form of quadrature amplitude modulated (QAM) symbols (i.e., wherein each symbol represents two bits, $b_i$ and $b_j$), although the invention is not limited in this respect. That is, according to one embodiment, the received content is modulated into symbols (e.g., QAM, BPSK, QPSK, 8-PSK, 16-PSK, 128-PSK, 256-PSK, and the like). In alternate embodiments, a symbol generator (e.g., a QAM modulator) (not particularly denoted) may precede the serial-to-parallel converter 102 to generate symbols from a received bit stream.

As shown, serial-to-parallel transform 102 may generate a number of parallel substreams of symbols that are passed to one or more instances of coding agent 104. Although depicted as a separate functional element, serial to parallel transform 102 may well be included within, or include embodiments of coding agent 104, or another element of the transmitter 100.

According to but one example embodiment, coding agent 104 is depicted comprising one or more of a precoder 112A ... Z and a space frequency encoder(s) 114, each coupled as depicted, although the invention is not limited in this regard. According to one embodiment, the precoder functionality may well be integrated within the space-frequency encoder 114. In this regard, coding agent(s) 104 of greater or lesser complexity that nonetheless generates a full-rate, space-frequency matrix of encoded symbols are anticipated by the disclosure herein.

According to certain embodiments, precoders 112 may encode a plurality of symbol vectors by multiplying each symbol vector by a complex field matrix to generate precoded symbol vectors. In some embodiments, coding agent 104 may also include a partitioner (not particularly denoted) to group precoded symbol vectors into a plurality of groups of one or more symbol vectors. According to one example embodiment, each group may comprise more than one of the precoded symbol vectors.

According to one embodiment, precoder 112 may be a linear-square precoder and may separately precode each of a number of parallel symbol vectors from S/P 102 to generate the plurality of precoded symbol vectors. In some embodiments, the complex field matrix (e.g., theta) used by precoder 112 may be a square complex field matrix of size MK×MK having a substantially row-wise Vandermonde structure, although the scope of the invention is not limited in this regard. As used herein, a Vandermonde matrix may refer to a type of matrix that arises in the polynomial least squares fitting of Lagrange interpolating polynomials and the reconstruction of a statistical distribution from the distribution's moments, although the invention is not limited in this regard.

In some embodiments, precoder 112 may encode an M×G number of parallel symbol vectors, wherein each parallel symbol vector may have M×K symbols. In such an embodiment, precoder (or, space-frequency encoder, or the partitioner introduced above) 112 may group precoded symbol vectors into G groups of the parallel symbol vectors. According to some embodiments, at least a subset of the G groups may have M of the precoded symbol vectors. In these embodiments, M, G and K may be selected to satisfy the equation Nc=M×K×G, in which Nc may refer to the number of data subcarriers of the multicarrier communication channel. M, G and K may be positive integers, although the scope of the invention is not so limited, where M is the number of spatial channels and/or transmit antennae, G is the number of groups, and K is the design parameter related to the channel order. In certain embodiments, K and G may be selected based, at least in part, on the number of subcarriers desired and the number of antennas, among other criteria. According to one embodiment, design parameter K may be used to predict the channel tap number L, whereas long as K is greater than or equal to L is chosen for each layer, the space-frequency diversity gain of (N−M+1)*L is achieved.

In some embodiments, space-frequency encoder 114 may receive the precoded symbols from precoder 112 and map the precoded symbols of the precoded symbol vectors to one of a plurality of subcarriers of a multicarrier communication channel, and to one of a plurality of spatial channels. In some embodiments, space-frequency encoder 114 may map precoded symbols to one of the subcarriers and to one of the spatial channels based, at least in part, on the symbol's group and the symbol's position within the group, although the scope of the invention is not limited in this regard.

In some embodiments, in addition to mapping the groups to channels and/or antennae, space-frequency encoder 114 may also determine power allocation, e.g., on a layer-by-layer basis, a group-by-group basis and the like, although the scope of the invention is not so limited. According to one aspect of the invention, to improve the reliability of detection and to reduce the effect of error propagation, space-frequency encoder 114 may employ unequal power allocation in which the layer with the largest transmit power will be detected first. According to one embodiment, the unequal power mechanism is applied to the layers by multiplying the elements of the different layers by a coefficient (e.g., a power coefficient) associated with that layer. According to one embodiment, the generated coefficient may be expressed as:

$\sqrt{2^{m-1}M/\text{sum}}$, where $$\text{sum} = \sum_{m=1}^{M} 2^{m-1}$$

to the m-th layer.

Assume that $E|s_m|^2=E_s$, for m=1 ... M. Insofar as:

$$\sum_{m=1}^{M}\left|\sqrt{\frac{2^{m-1}M}{\text{sum}}}s_m\right|^2 = \sum_{m=1}^{M} M\frac{2^{m-1}}{\text{sum}}E_s = ME_s = \sum_{m=1}^{M}E|s_m|^2$$

it is clear that the total transmit power, albeit divided differently among the different layers of the full-rate, space frequency block code matrix is the same as in an equal-power allocation case. Unlike the equal-power allocation case, however, the transmitter can control the detection order as the layer with the largest transmit power will be detected first at the receiver to mitigate error propagation and improve receive performance.

In accordance with the illustrated example embodiment, space-frequency encoder 114 of coding agent 104 passes the space-frequency encoded vectors to one or more inverse discrete Fourier transform (IDFT) element(s) 106 to generate time-domain signals suitable for RF transmission via one or more corresponding spatial channels or transmit antenna(e) 120A ... M. According to one embodiment, the IDFT(s) 106 may be inverse fast Fourier transform (IFFT) elements, although the invention is not limited in this regard. According to one embodiment, the number of IDFT elements 106 may be commensurate with the number of transmit antenna(e), M, although the scope of the invention is not so limited.

The time domain content from the IDFT element(s) 106 may be passed to CPI element(s) 108, which may introduce a cyclical prefix, or a guard interval in the signal(s) to improve ISI performance, although the scope of the invention is not limited in this regard. Transmitter 100 may also include a radio frequency (RF) front-end 110 for, e.g., amplification and/or filtering prior to subsequent transmission via an associated one or more antenna(e) 120A ... M. Thus, an embodiment of multicarrier communication channel 122 is generated, according to one example embodiment of the present invention.

To extract content processed by a remote transmitter (e.g., 100), an example receiver architecture 150 is introduced. In some embodiments, receiver 150 may receive multicarrier communication signals such as, e.g., OFDM and/or DMT signals over a multicarrier communication channel (e.g., 122). In some embodiments, receiver 150 decodes signals that may have been encoded with a full-rate space frequency block code and may not require the use of convolutional or error correcting decoding, although the scope of the invention is not limited in this regard. In some embodiments, receiver 150 decodes signals received over a multicarrier communication channel encoded with full-rate space frequency block codes using an iterative nulling process to successively cancel interference from layers of the symbols.

According to one example embodiment, receiver 150 is depicted comprising one or more of a radio frequency (RF) front end 154, a cyclic prefix (or, guard interval) removal element(s) 156, discrete Fourier transform element(s) 158, an enhanced sphere decoding element(s) 160, and parallel-to-serial transform element(s) 162, each coupled as depicted to generate a representation (I') of the originally transmitted information (I).

As shown, an RF front-end 154 may receive a plurality of signals impinging on one or more receive antennae 152A ... N. According to one embodiment, each receive antenna has a dedicated receive chain, where the number of receive front-end elements 154, CPR elements 156 and DFT elements 158 are commensurate with the number (N) of receive antenna(e) (e.g., N), although the invention is not so limited.

After some initial RF and (optionally) cyclic prefix (or, guard interval) processing, the content is presented to discrete Fourier transform (DFT) element(s) 158. According to one embodiment, DFT elements 158 may employ a fast Fourier transform to the received signals to convert the received signals from a time domain to the frequency domain. In this regard, a plurality encoded symbol vectors representing the received signal(s) are presented to the enhanced sphere decoder(s) 160.

In some embodiments, enhanced sphere decoder(s) 160 may include one or more of a demultiplexer element(s), a null canceller element(s) as well as sphere decoder element(s), although the invention is not so limited. According to one example embodiment, enhanced sphere decoder(s) 160 receive content at a demultiplexer element(s) to generate groups of symbol vectors 107 by combining corresponding subcarrier frequency components of the received symbol vectors. Each group of symbol vectors may have symbol components combined from different subcarriers. In some embodiments, symbol vectors 107 may be generated by demultiplexer in G groups. In some embodiments, each of the symbol vectors may have a length of M×K encoded symbols. In some embodiments the demultiplexer elements of enhanced sphere decoder(s) 160 may reshape row vectors into column vectors to collect and group information from some subcarriers received on all receive antennae 152, although the invention is not so limited.

Enhanced sphere decoder 160 may also include a null canceller associated with each group of symbol vectors 107 to perform null canceling on a per-subcarrier basis for symbol vectors of the associated group based on a decoded symbol vector 117, although the invention is not limited in this regard. In some embodiments, the null canceller element(s) may generate null-cancelled symbol vectors 109.

As shown, a number of sphere decoder element(s) may be used by enhanced sphere decoders 160 associated with each group of null-cancelled symbol vectors. In some embodiments, precoded symbols from the same group within the same layer are detected using the spherical decoder element(s) in order to achieve near ML diversity performance. As introduced above and described more fully below, detected symbols are cancelled from the received symbol vectors to remove their interference impact on other layers before detection of symbols in the other layers is performed.

According to one embodiment, the enhanced sphere decoder 160 may multiply an output of the sphere decoder with a complex-field matrix (e.g., theta used in the encoding process). In this way, enhanced spherical decoder(s) 160 may regenerate a precoded symbol vector (e.g., regenerate the current layer) 117 for null canceller so that the null canceller may cancel the current layer's contribution from the symbol vectors until all layers are decoded. In some embodiments, nulling may be done once for each subcarrier while canceling may be done for M−1 iterations, until all layers are decoded, although the scope of the invention is not limited in this regard.

In some embodiments, the decoder elements of enhanced sphere decoder(s) 160 may perform maximum likelihood (ML) detection within a sphere, or spherical limit, unlike an exhaustive ML detection mechanism. In some embodiments, the decoder element of enhanced sphere decoders 160 may generate decoded QAM symbol vectors for each subcarrier of the multicarrier communication channel. According to some embodiments, the QAM symbol vectors are passed through a QAM demapper (not particularly detailed) prior to parallelto-serial conversion 162, which outputs a representation (I') of the originally transmitted content (I).

In some embodiments, the null canceller of the enhanced sphere decoder(s) 160 may null symbols so that the $i^{th}$ layer may still have interference from the first layer through the $i^{th}-1$ layer, and substantially no interference from the $i^{th}+1$ layer to the $M^{th}$ layer within a symbol vector for a specific subcarrier frequency, although the scope of the invention is not so limited. In some embodiments, the null canceller element(s) may cancel some elements of the symbol vectors 107 received from the demultiplexer after nulling based on the symbol vector 117 received from the sphere decoder element(s).

According to one embodiment, the sphere decoder element(s) of enhanced sphere decoder 160 may employ an algorithm to improve performance (in the ML sense) with polynomial complexity in MK (e.g., $O((MK)^3)$ for real block of length MK, and $O((2MK)^3)$ for a complex-valued block) regardless of the constellation size, which is very useful especially for high-rate transmission. According to one embodiment, null canceling is a low-complexity (e.g., $O(M^3)$ for block length M). In this regard, receiver 150 implements a novel generalized QR which considers the noise effect in the QR decomposition to improve performance.

Multicarrier transmitter 100 and/or receiver 150 may be part of a host electronic device, broadly defined herein to include, but are not limited to, a personal digital assistant (PDA), a laptop or portable computer with wireless communication capability, a web tablet, a digital camera, an access point or other device that may receive and/or transmit information wirelessly. In some embodiments, transmitter 100 and/or receiver 150 may operate in compliance with one or more evolving communication standards. Examples of such standards include, but are not limited to the Institute of Electrical and Electronics Engineers (IEEE) standards including IEEE 802.11(a), 802.11(b), 802.11(g/h) and/or 802.11n standards for wireless local area networks (WLANs) and/or 802.16 standard for wireless metropolitan area networks (WMAN), although the transmitter 100 and/or receiver 150 may also be suitable to transmit and/or receive communications in accordance with other techniques including, but not limited to, the digital video broadcasting terrestrial (DVB-T) broadcasting standard, and/or the High performance radio Local Area Network (HiperLAN) standard.

Although some embodiments of the invention may be discussed within the context of an 802.X implementation (e.g., 802.11x, 802.16, 802.18, 802.20, etc.) the claims are not so limited. Some embodiments of the invention may be implemented as part of any wireless communication system utilizing multicarrier communication channels such as, e.g., WLAN, WPAN, WMAN, a cellular telephony/data network, a third-generation (3G) communications network, a fourth-generation (4G) communications network, and the like.

Figure 2:
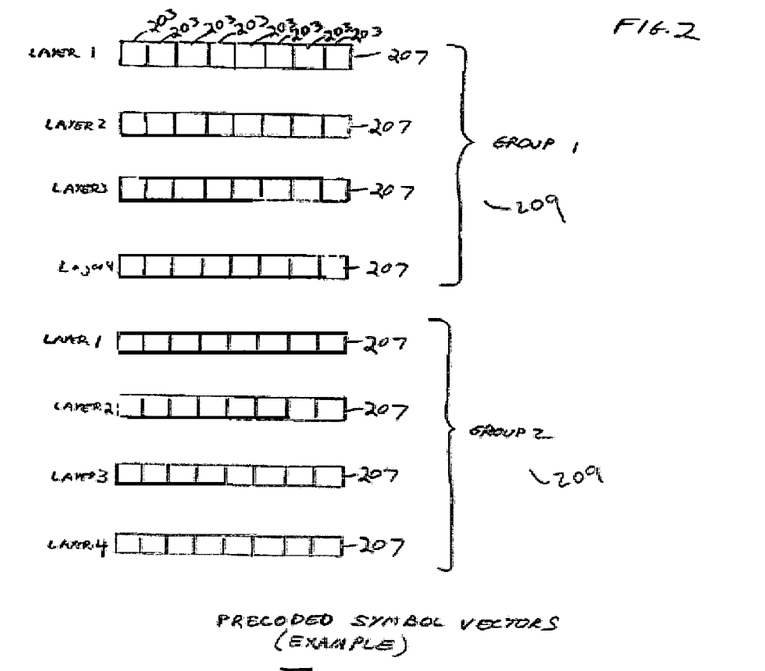
FIG. 2 is a block diagram of an example series of precoded symbols, according to one example embodiment.

FIG. 2 illustrates an example of precoded symbol vectors in accordance with some embodiments of the invention. In some embodiment, the symbols of precoded symbol vectors 207 may be associated with, or divided into, discrete layers of symbols. Precoded symbol vectors 207 may correspond to the precoded symbol vectors generated by precoder 112 in FIG. 1, although the invention is not so limited. Such precoded symbol vectors 207 may be grouped into two or more groups 209. Each precoded symbol vector 207 may comprise a plurality of precoded symbols 203.

In some embodiments, there may be M layers of for each of the G groups. In some embodiments, the number of layers M may at most be no more than the number of transmit antennae M. In these embodiments, space-frequency encoder 114 may map each precoded symbol 203 of the precoded symbol vectors 207 to one of the subcarriers and to one of the transmit antennas based on the group and the layer associated with the symbol. In such an embodiment, space frequency encoder 114 may map M×K×G symbols to each transmit antenna and/or spatial channel and may provide the mapped symbols in multiples of the M×K×G symbols to the IDFT element 106.

According to one embodiment, illustrated in FIG. 2 a block architecture comprising four (4) layers for each of the two (2) groups of precoded symbol vectors 207 in which each of the precoded symbol vectors 207 comprises eight (8) precoded symbols. In this embodiment, there may be sixteen data subcarriers of the multicarrier communication channel. As introduced above, space frequency encoder 114 performs power allocation on a per-layer basis to improve detection reliability in the receiver.

Figure 3:
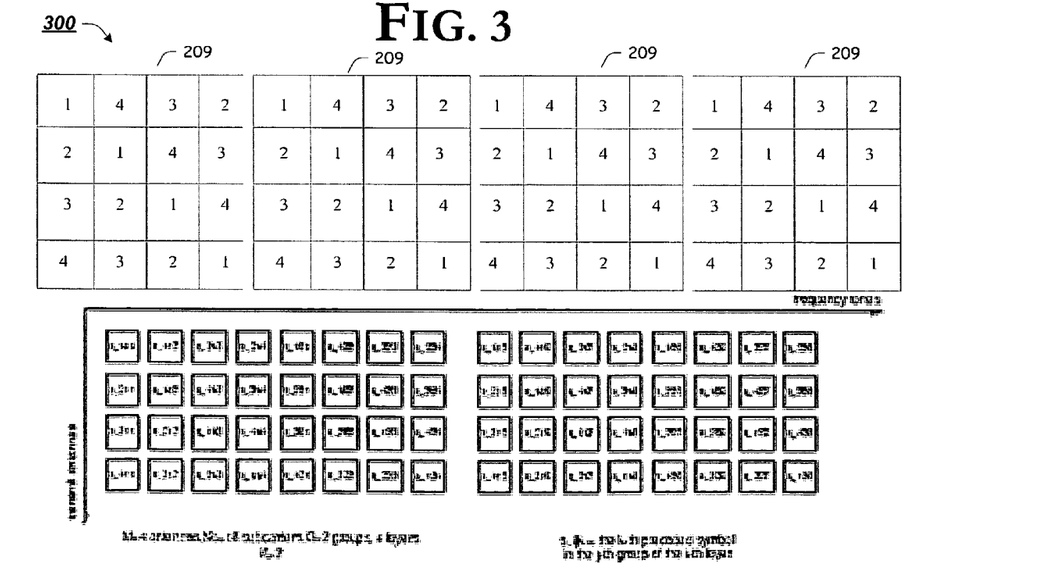
FIG. 3 is a block diagram of an example full-rate, space-frequency block code architecture, according to one example embodiment.

FIG. 3 illustrates space-frequency mapping in accordance with some embodiments of the invention. Precoded symbols may be mapped to one of transmit antennae 120A . . . M or spatial channels (illustrated in rows) and to one of the subcarriers (illustrated in columns) based on the precoded symbol's layer (1-4) and group (1 or 2). In FIG. 3, precoded symbols may correspond to precoded symbols 203 (FIG. 2) and are illustrated as $S_{ijk}$, in which i represents the $i^{th}$ layer, j represents the $j^{th}$ group, and k represents the $k^{th}$ precoded symbol. In the example having sixteen (16) subcarriers, precoded symbols of the first group may be mapped to subcarriers one through four and subcarriers nine through twelve, while precoded symbols of the second group may be mapped to subcarriers five through eight and subcarriers thirteen through sixteen.

In some embodiments, such as the one disclosed, precoded subcarriers of a particular layer may be mapped diagonally. For example, for symbols of the first group, first symbol of the first layer may be mapped to the first subcarrier and the first transmit antenna, second symbol of the first layer may be mapped to the second subcarrier and the second transmit antenna, the third symbol of the first layer may be mapped to the third subcarrier and the third transmit antenna, the fourth symbol of the first layer may be mapped to the fourth subcarrier and the fourth transmit antenna, the fifth symbol of the first layer may be mapped to the ninth subcarrier and the first transmit antenna, the sixth symbol of the first layer may be mapped of the tenth subcarrier and the second transmit antenna, the seventh symbol of the first layer may be mapped to the eleventh subcarrier and the third antenna, and the eighth symbol of the first layer may be mapped to the twelfth subcarrier and the fourth antenna. This mapping may be similarly applied to the other layers and the other groups as presented in FIG. 3. Other mappings based on layers and groups may also be performed by space frequency encoder 114 without deviating from the spirit and scope of the invention.

Example Transmitter/Receiver Operation

Figure 4:
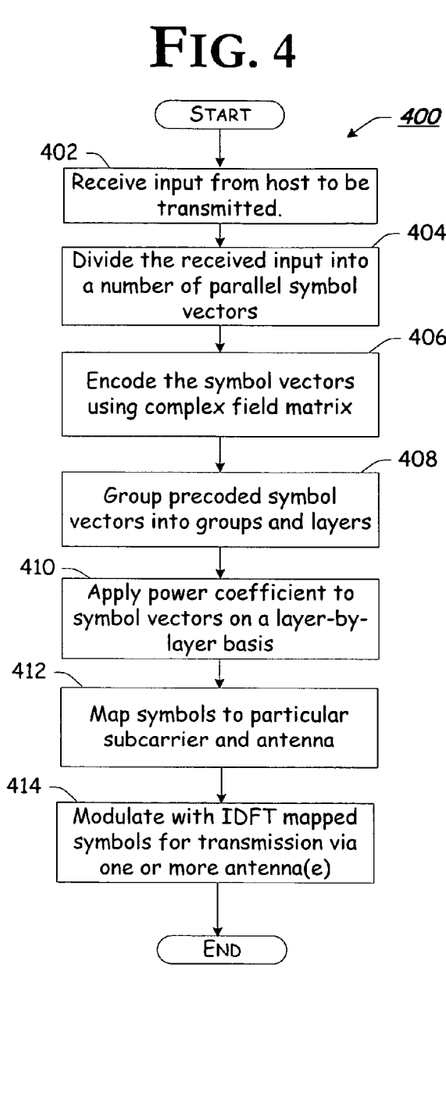
FIG. 4 is a flow chart illustrating an example method for generating content for transmission in accordance with one example embodiment.

Turning to FIG. 4, a flow chart of an example method of transmit operation is provided in accordance with but one example embodiment. For ease of discussion, and not limitation, this discussion will make reference to the transmitter, receiver and block code architecture(s) introduced hereinabove, although the scope of the invention is not so limited.

In accordance with the illustrated example of FIG. 4, the transmit method begins with block 402, where transmitter 100 receives content (I) from a host device/application for transmission to a remote device through a multicarrier wireless communication channel (122). As introduced above, if the input is a serial bit-stream, transmitter 100 may include a modulator such as, for example, a QAM modulator to generate a stream of symbols from the received bitstream.

In block 404, the transmitter 100 may divide the received symbol stream into a plurality of parallel symbol vectors. According to one embodiment, each symbol vector may have more than one symbol. According to one embodiment, serial-to-parallel converter 102 generates a plurality of parallel streams from the received symbol stream.

In block 406, the plurality of symbol streams received from the serial-to-parallel converter 102 are encoded. According to one embodiment, the symbol vectors are encoded using a linear complex field matrix in precoders 112. In some embodiments, the complex field matrix may be a square complex field matrix having substantially a row-wise Vandermonde structure, although the scope of the invention is not so limited.

The precoded symbol streams generated in the precoders 112 are then passed to space-frequency encoder 114, where the precoded symbol vectors are grouped into groups and reshaped into layers, block 408. Each group may have more than one of the precoded symbol vectors. As discussed above, the symbol vectors distributes the linear complex field (LCF) precoded symbols to uncorrelated tones and antennas in order to increase the effective diversity gain of the channel.

In block 410, space-frequency encoder 114 may generate and apply power coefficients to symbol vectors on a layer-by-layer basis. As introduced above, the power coefficients vary the power allocated to at least a subset of the layers, thereby ensuring proper detection order at the receiver. According to one embodiment, the unequal power allocation mechanism employed by the space-frequency encoder 114 ensures that the total power allocated is commensurate with that of conventional equal-power allocation schemes.

In block 412, space-frequency encoder 114 maps precoded symbols of the precoded symbol vectors to one of a plurality of subcarriers of the multicarrier communication channel and to one of a plurality of spatial channels based, at least in part, on the precoded symbol's group and the precoded symbol's position within the group. In some embodiments, operation 412 may comprise mapping the precoded symbols of the precoded symbol vectors to one of the subcarriers of the multicarrier communication channel and to one of the plurality of transmit antennae. Each transmit antenna may correspond to one of the spatial channels, although the scope of the invention is not so limited.

In block 414, the encoded symbol streams are applied to an inverse discrete Fourier transform element(s) to generate modulated signals for RF transmission on a corresponding one of the spatial channels from space-frequency mapped symbols generated by space-frequency encoder 114. As introduced above, the modulated signals may be processed to include a cyclical prefix or a guard interval to improve error correction capability at the receiver, although the scope of the invention is not limited in this regard.

Figure 5:
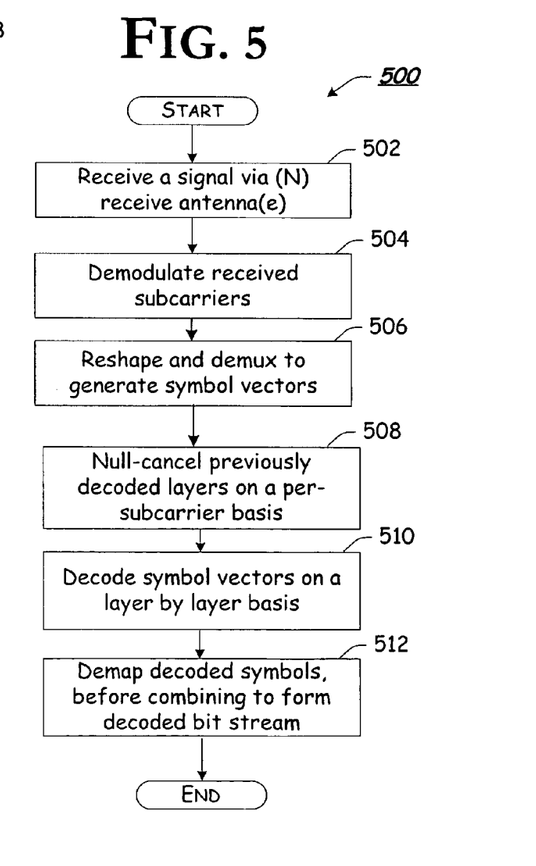
FIG. 5 is a flow chart illustrating an example method for receiving content in accordance with one example embodiment.

Turning to FIG. 5, a method for receiving content encoded utilizing the full-rate space frequency block code architecture introduced herein begins with block 502, wherein the receiver 150 receives elements of a multicarrier communication channel 122 via a number (N) of receive antennae. The signals are passed through an RF front end and, optional cyclical prefix removal circuitry to remove any cyclical prefix or guard interval introduced during transmit processing. The RF front-end passes these initially processed signals to discrete Fourier transform (DFT) elements 158.

In block 504, the signals received via each of the antennas is demodulated to generate received symbol vectors associated with each of the antennas. In some embodiments, the received symbol vectors may include symbol components from each of the subcarriers of the multicarrier communication channel. According to one embodiment, the symbol vectors are generated by a discrete Fourier transform 158 (e.g., FFT), which translates the received signal from the time domain into the frequency domain.

In block 506, groups of symbol vectors are generated by combining corresponding subcarrier frequency components of the received symbol vectors, e.g., in a demultiplexer element of the enhanced sphere decoder 160. In some embodiments, block 506 comprises reshaping and/or demultiplexing the symbol vectors.

In block 508, enhanced sphere decoder 160 performs null canceling on a per-subcarrier basis for symbol vectors of an associated group based on a decoded symbol vector to generate null-cancelled symbol vectors. According to one embodiment, the null canceling element(s) of enhanced sphere decoder 160 performs the null canceling operation in an iterative fashion to iteratively cancel interference from the symbol vectors in successive layers, as described above.

Block 510 comprises decoding layers of symbols of the associated group by multiplying a decoded output one layer at a time by a complex field matrix to regenerate symbol vectors for performing the null canceling. According to one embodiment, proper power coefficient may be beneficially multiplied in symbol vector regeneration. According to one embodiment, precoded symbols from the same group within the same layer are detected using a sphere decoder. According to one embodiment, sphere decoder detects groups of symbols associated with a given layer with near ML performance but only polynomial complexity after other layers' effect have been suppressed by nuller-canceller.

In block 512, the decoded symbols are demapped for each group to generate a plurality of parallel sets of bits. According to one embodiment, the demapping may be performed by a demodulator such as, e.g., a QAM demodulator.

In block 514, the parallel bit streams are fed to a parallel to serial converter 162, which generates a serial bit stream representation (I') of the content originally processed for transmission by transmitter 100 (I).

Example Communications Environment

Figure 6:
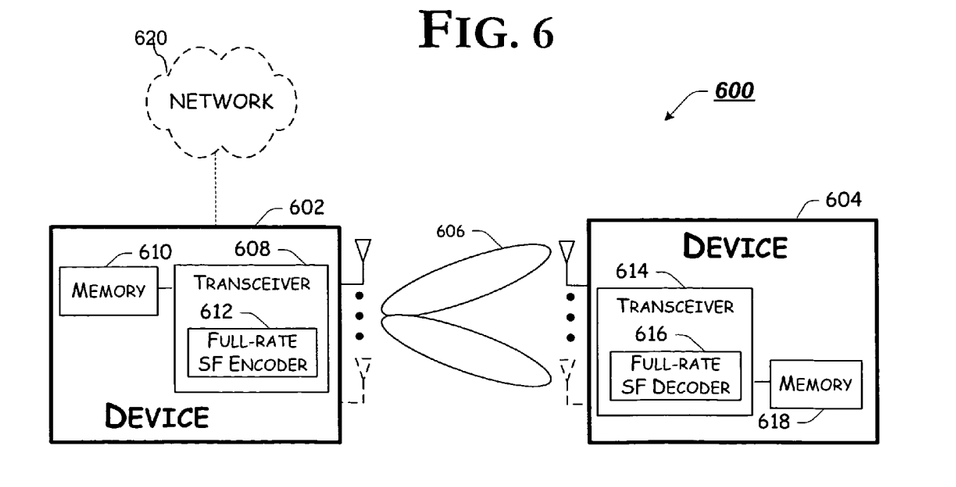
FIG. 6 is a block diagram of an example communication environment within which embodiments of the invention may be practiced, according to but one example implementation.

Turning briefly to FIG. 6, a block diagram of an example environment within which the invention may be practiced is presented, according to one embodiment. In accordance with the illustrated embodiment of FIG. 6, system 100 is depicted comprising a first device 602 in communication with a remote device 604 via a multicarrier communication channel 606. As shown, one or more of devices 602, 604 may well be coupled to another (e.g., wired) network 620 such as, e.g., the Internet, and intranet, a local area network and the like.

According to the illustrated embodiment, device 602 is depicted comprising a transceiver 608 coupled to a memory system 610. According to one embodiment, transceiver 608 includes a transmitter that includes a full-rate space frequency block coder 612 that performs the encoding described above. According to one embodiment, transmitter 100 may well be used. In addition, transceiver 608 may include a receiver architecture such as, e.g., that depicted as 150 in FIG. 1.

Device 604 may also include a transceiver architecture 614 including a full-rate, space-frequency block encoder 616, although the invention is not so limited. Transceiver 614 may be coupled to memory 618 as depicted, although the scope of the invention is not limited in this regard.

According to one embodiment, communication between a transmitter in device 602 and a receiver in device 604 is characterized and described in accordance with FIGS. 1-5, above.

Alternate Embodiment(s)

Figure 7:
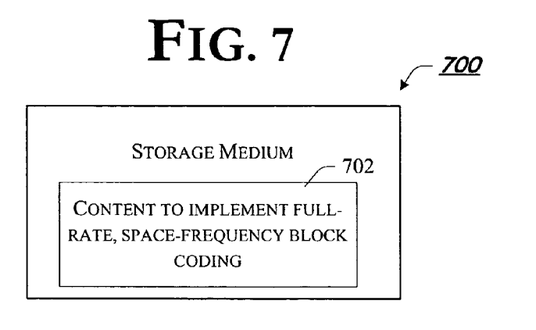
FIG. 7 is a block diagram of an example article of manufacture including content which, when executed by an accessing machine, causes the machine to implement one or more aspects of embodiment(s) of the invention.

FIG. 7 illustrates a block diagram of an example storage medium comprising content which, when invoked, may cause an accessing machine to implement one or more aspects of the robust full-rate, space frequency encoder, decoder and/or associated methods 400 and 500. In this regard, storage medium 700 includes content 702 (e.g., instructions, data, or any combination thereof) which, when executed, causes an accessing appliance to implement one or more aspects of embodiments of the invention described above.

The machine-readable (storage) medium 700 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. As used herein, all of such media is broadly considered storage media.

The present invention includes various operations. The operations of the present invention may be performed by hardware components, such as those shown in FIGS. 1 and/or 2, or may be embodied in machine-executable content (e.g., instructions) 702, which may be used to cause a general-purpose or special-purpose processor or logic circuits programmed with the instructions to perform the operations. Alternatively, the operations may be performed by a combination of hardware and software.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
   receiving groups of coded symbols of a symbol stream from different antenna(e); and
   detecting one group of signals ahead of another group of symbols based on the relative transmitted power.

2. The method of claim 1 further including:
   converting a symbol stream into two or more groups of a number of layers of coded symbols representing assignment to one or more of a subcarrier and an antenna of a multicarrier communication channel established through two or more transmit antennae; and
   generating a power coefficient for application to each symbol within the groups of layers, wherein the power coefficient for at least a subset of the layers is distinct from the other layers.

3. A method according to claim 2, the converting element comprising:
   precoding the symbol stream using a linear complex field matrix.

4. A method according to claim 3, wherein the complex field matrix comprises a square complex field matrix having a row-wise Vandermonde structure.

5. A method according to claim 4, the converting element comprising:
   distributing the linear complex field (LCF) precoded symbols to uncorrelated tones and antennas.

6. A method according to claim 5, wherein the power coefficient applied to a given layer is expressed as $\sqrt{2^{m-1}M/\text{sum}}$, where $$\text{sum} = \sum_{m=1}^{M} 2^{m-1}$$

to the $m^{th}$ layer, wherein M is a positive integer and m=1 ... M.

7. A method according to claim 6, further comprising:
   applying power coefficients to symbol vectors on a layer-by-layer basis.

8. A method according to claim 7, wherein the power coefficients vary the power allocated to at least a subset of the layers to improve detection at a remote receiver.

9. A method according to claim 7, wherein the total power applied to an aggregate of all of the layers is equal to a situation where an equal amount of power were applied to all of the layers.

10. A method according to claim 7, further comprising mapping the precoded symbols of the precoded symbol vectors to one of a plurality of subcamers of the multicarrier communication channel and to one of a plurality of spatial channels based, at least in part, on the precoded symbol's group and the precoded symbol's position within the group.

11. A method according to claim 10, wherein each transmit antenna may correspond to one of the spatial channels.

12. A method according to claim 10, further comprising:
    transforming the encoded symbol vectors to generate modulated signals for RF transmission on a corresponding one of the spatial channels from space-frequency mapped symbols.

13. A method according to claim 12, further comprising:
    transmitting the generated modulated RF signals to a remote receiver.

14. A method according to claim 3, the converting element comprising:
    grouping the precoded symbols into groups and reshaped into layers.

15. A method according to claim 14, wherein each group comprises two or more precoded symbol vectors.

16. A storage medium comprising content which, when executed by an accessing appliance, causes the appliance to:
    receive groups of coded symbols of a symbol stream from different antenna(e); and
    detect one group of signals ahead of another group of symbols based on the relative transmitted power.

17. A storage medium according to claim 16 that causes the appliance to convert a symbol stream into two or more groups of a number of layers of coded symbols representing assignment to one or more of a subcarrier and an antenna of a multicarrier communication channel established through two or more transmit antennae, and to generate a power coefficient for application to each symbol within the groups of layers, wherein the power coefficient for at least a subset of the layers is distinct from the other layers.

18. A storage medium according to claim 17, where the content causing the appliance to convert symbols comprises content that causes the appliance to precode the symbol stream using a linear complex field matrix.

19. A storage medium according to claim 18, wherein the complex field matrix comprises a square complex field matrix having substantially a row-wise Vandermonde structure.

20. A storage medium according to claim 18, the element of converting comprising:
grouping the precoded symbols into groups and reshaped into layers.

21. A storage medium according to claim 20, the converting element further comprising:
distributing the linear complex field (LCF) precoded symbols to uncorrelated tones and antennas.

22. A storage medium according to claim 21, further comprising content which, when executed, causes the accessing machine to map the precoded symbols of the precoded symbol vectors to one of a plurality of subcarriers of the multi-carrier communication channel and to one of a plurality of spatial channels based, at least in part, on the precoded symbol's group and the precoded symbol's position within the group.

23. A storage medium according to claim 22, wherein each transmit antenna may correspond to one of the spatial channels.

24. A storage medium according to claim 22, further comprising content which, when executed, causes the accessing machine to transform the encoded symbol vectors to generate modulated signals for RF transmission on a corresponding one of the spatial channels from space-frequency mapped symbols.

25. A storage medium according to claim 17, wherein the power coefficient applied to a given layer is expressed as $\sqrt{2^{m-1}M/\text{sum}}$, where $$\text{sum} = \sum_{m=1}^{M} 2^{m-1}$$

to the $m^{th}$ layer, where M is a positive integer and m=1 ... M.

26. A storage medium according to claim 25, further comprising content which, when executed, causes an accessing machine to apply power coefficients to symbol vectors on a layer-by-layer basis.

27. A system comprising:
a precoder, to convert a symbol stream into two or more groups of a number of layers of coded symbols;
a space-frequency encoder, to assign at least a subset of the precoded symbols to one or more of a number of sub-carrier and an antenna of a multicarrier communication channel established through two or more transmit antennae, and to generate a power coefficient for application to each symbol within the groups of layers, wherein the power coefficient for at least a subset of the layers is distinct from the other layers; and
one or more dipole antenna(e) through which the system can establish an OFDM communication channel with one or more remote device(s).

28. An apparatus comprising:
two or more transmit antennas; and
a coding agent, responsive to content received through the apparatus, to convert a symbol stream into two or more groups of a number of layers of coded symbols representing assignment to one or more of a subcarrier and an antenna of a multicarrier communication channel established through the two or more transmit antennae, and to generate a power coefficient for application to each symbol within the groups of layers, wherein the power coefficient for at least a subset of the layers is distinct from the other layers.

29. An apparatus according to claim 28, the coding agent comprising:
a precoder, to covert the symbol stream into the two or more groups of a number of layers of coded symbols.

30. An apparatus according to claim 29, the coding agent further comprising:
a space-frequency encoder, to distribute the linear complex field (LCF) precoded symbols to uncorrelated tones of an orthogonal frequency division multiplexing (OFDM) communication channel through at least a subset of multiple antennas associated with the apparatus.

31. An apparatus according to claim 30, wherein the space-frequency encoder generates a power coefficient for application to the precoded symbols on a layer-by-layer basis, wherein the power coefficient associated with at least a subset of a plurality of layers is different one from another.

32. An apparatus according to claim 31, wherein the generated power coefficient may be expressed as $\sqrt{2^{m-1}M/\text{sum}}$, where $$\text{sum} = \sum_{m=1}^{M} 2^{m-1}$$

to the $m^{th}$ layer, wherein M is a positive integer and m=1 ... M.

33. An apparatus according to claim 30, further comprising:
one or more dipole antenna(e) through which the apparatus can establish an OFDM communication channel with one or more remote device(s).

34. An apparatus according to claim 29, wherein the precoder groups the precoded symbols into groups and reshaped into layers.

35. An apparatus according to claim 28, wherein the precoder encodes the symbol stream using a linear complex field matrix.

36. An apparatus according to claim 35, wherein the linear complex field matrix comprises a square complex field matrix having substantially a row-wise Vandermonde structure.

* * * * *

UNITED STATES PATENT AND TRADEMARK OFFICE
CERTIFICATE OF CORRECTION

| | | |
|---|---|---|
| PATENT NO. | : 7,929,632 B2 | Page 1 of 1 |
| APPLICATION NO. | : 10/942247 | |
| DATED | : April 19, 2011 | |
| INVENTOR(S) | : Lei Shao | |

It is certified that error appears in the above-identified patent and that said Letters Patent is hereby corrected as shown below:

Column 12:
Line 32, "subcamers" should be --subcarriers--.

Signed and Sealed this
Twenty-first Day of June, 2011

David J. Kappos
*Director of the United States Patent and Trademark Office*